March 12, 1929.  J. M. LEA  1,705,021
STORAGE BATTERY
Filed Jan. 23, 1922   2 Sheets-Sheet 2

Witness:

Inventor
John M. Lea
By his Attorneys

Patented Mar. 12, 1929.

1,705,021

UNITED STATES PATENT OFFICE.

JOHN M. LEA, OF DETROIT, MICHIGAN.

STORAGE BATTERY.

Application filed January 23, 1922. Serial No. 531,172.

The invention relates to electric storage batteries, especially portable batteries of the lead-sulphuric acid type, and is more particularly concerned with the mounting and assembly of battery elements and a novel form of container therefor.

The principal object of the invention is to provide a storage battery construction especially adapted to facilitate assembly and disassembly of the parts. To this end the invention contemplates the employment of a single container having individual compartments for the cells of the battery, and covering or enclosing means, together with specific adaptation of the battery elements, which parts may be assembled without requiring special tools or skill and may be as readily removal or replaced when inspection or servicing become necessary.

Other objects and advantages will appear from the following description taken in connection with the accompanying drawings, in which Fig. 1 is a perspective view of one embodiment of the invention;

Figure 1:
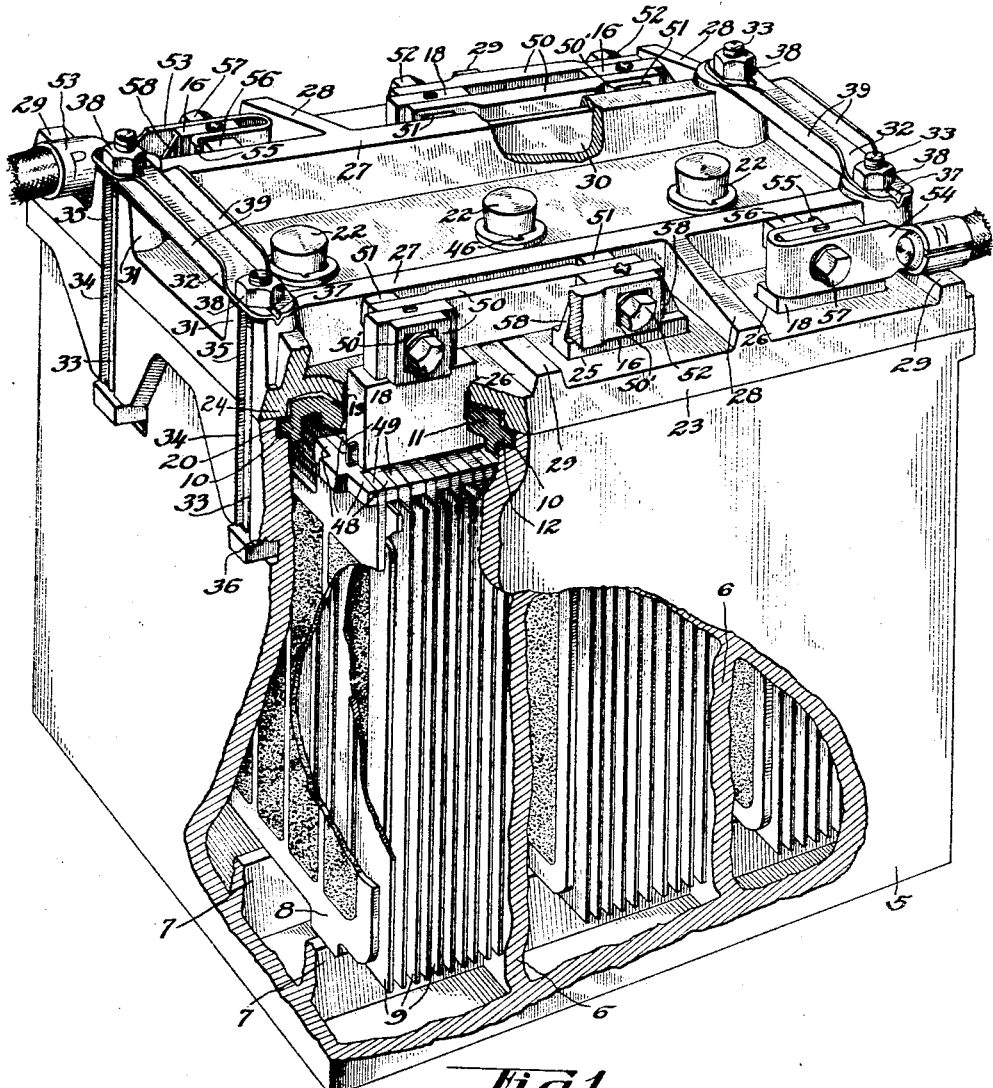
Figure 2:
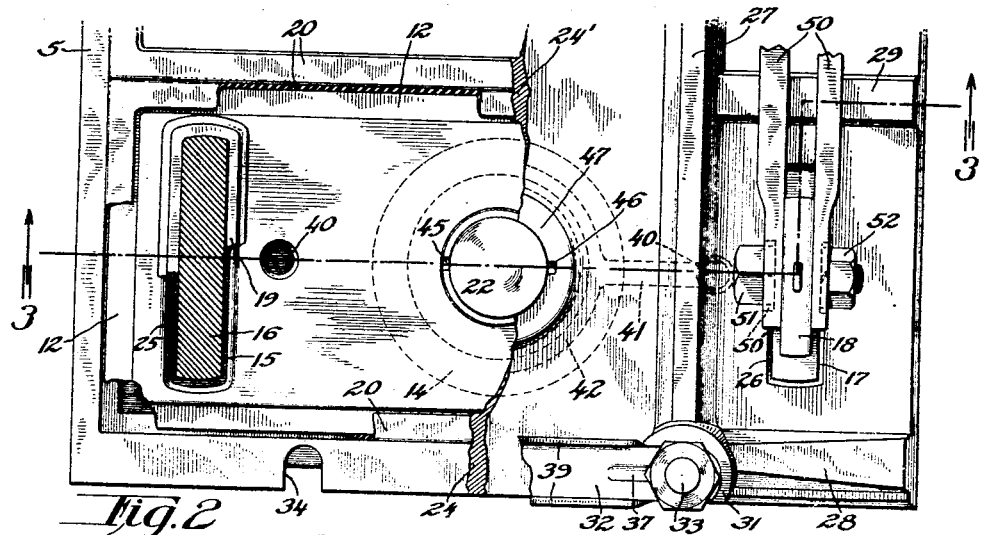
Fig. 2 is a plan view, broken away in part, of one end of the battery shown in Fig. 1.

Referring to the drawings, 5 indicates a container which, in accordance with my invention, serves the purpose both of the individual cell receptacles or jars and of the battery box which are customarily employed. The material of the container, as well as that of the cell covers and battery cover hereinafter described, is preferably of such character as may be subjected to plastic molding operations, is a non-conductor of electricity, and is not affected by the electrolyte used in the battery. It should also be of sufficient strength and wear-resisting properties to enable it to stand up under the ordinary uses to which batteries of this type are subjected, as, for example, during the ordinary life of an automobile in which the battery may be installed. Among the materials having the properties designated, mention may be made of rubber or rubber-like compositions reinforced with fibre, which are now on the market. One of these materials which I have found satisfactory in practice is known under the trade name of Rub-Tex.

The container 5 is divided by vertical partitions 6 into compartments of the same number as that of the cells of which the completed battery is to be composed. Ribs 7 are provided on the floor of the container, which serve not only for strengthening means but also as supports for the battery elements, as plates 8 and separators 9. The spaces between the ribs provide for the collection of sediment or sludge which may accumulate during the operation of the battery. The present invention is not concerned with the specific character of the plates or separators and hence a more specific description thereof is deemed unnecessary, it being understood that the separators will be formed from specially treated wood or other insulating material and that the frames or grids of the plates 8 will be of lead or an alloy thereof.

Figure 3:
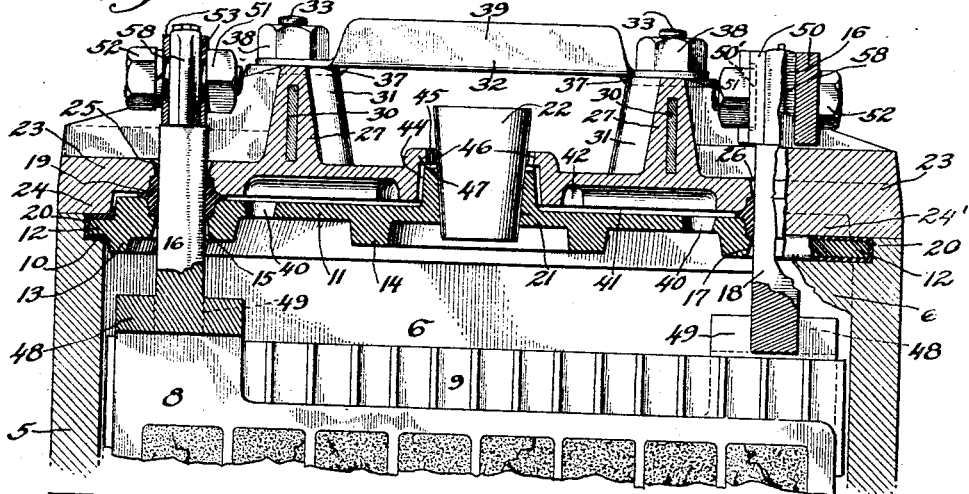
Fig. 3 is a section on line 3—3 of Fig. 2.
Figure 4:
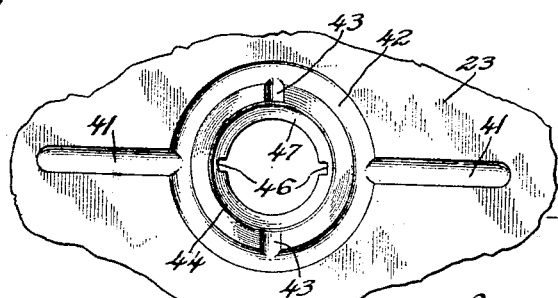
Fig. 4 is a bottom plan view of a portion of the battery cover.

The upper edge of the container 5 is cut away at the inner corner to provide a shoulder or ledge 10 for the support of the cell covers hereinafter referred to, the top surface of the partitions 6 being at the same level as the horizontal surface of the ledge, as shown in Fig. 3.

For each cell of the battery I provide an individual cell cover 11, which is preferably so shaped as to be capable of being molded from plastic material of the character mentioned above. This cover is formed with a peripheral flange 12 adapted to seat upon the ledge 10 and the upper edge of the partition 6, the distance between the partitions being such that the covers may be preferably all of the same size and identical in shape. The cover is stiffened by suitable means, as by ribs 13 adjacent the outer edge and an annular rib 14 near the center. An aperture 15 is provided at one end adapted to permit the passage therethrough of the post 16 of one set of battery plates, for example, the positive plates, and at the other end an aperture 17 adapted to permit the passage of the post 18 from the other set of plates, as the negative set. The two posts 16 and 18 are of different contour or size in order to prevent improper assembly, and are preferably rectangular in cross section. The difference in contour may be provided in various ways, but, as shown, the positive post is of greater dimension transversely of the cell than the negative post. By varying the longitudinal dimensions of the posts a considerable difference in contour may be obtained without any very material difference in the cross sectional area. The rectangular form is also desirable in that it provides relatively large contact area for the connectors and improved current distribution to the battery plates, as well as enabling the use of short clamping bolts with corresponding saving in material. The apertures 15 and 17 will, of course, be of such size and shape as to conform to the respective posts. Sealing devices 19, which may consist simply of elastic bands of soft rubber, are placed around the posts 16 and 18 above the cell covers, the bands being preferably of such length as to be slightly stretched when applied around the posts. Sealing or gasket devices 20, which may also consist of elastic bands of rubber of such length as to require stretching in order to be properly positioned, are placed upon the ribs 12 to form liquid-tight joints between the cell covers and the container and between the cell covers and the battery cover when the parts have been assembled. A filling aperture 21 is provided centrally of the cell cover, which aperture is normally closed by a rubber stopper 22.

The container or battery cover 23 is formed, preferably by molding, in a single piece of such size as to fit the top of the receptacle 5 and enclose and retain in position the individual cell covers 11. For this purpose the cover 23 comprises a downwardly projecting flange 24 at its periphery adapted to seat upon the upper edge of the container 5 and to engage the sealing bands 20 of the several cell covers, and with transverse ribs 24' arranged to register with the partitions 6 and adapted to clamp the adjacent edges of the cell covers to the partitions. The cover is also provided with apertures 25, 26, of size and shape corresponding respectively to the cross section of the posts 16 and 18. If the battery includes three cells, as shown in the drawing, the cover will necessarily have six apertures for the respective posts, and since the apertures are of different contour or size for the respective terminals of different polarity, it will be obvious that they constitute a means for insuring proper assembly of the battery elements. Around each of the apertures 25, 26, on the lower surface of the cover, is formed a groove adapted to receive the upper edge of the sealing means or band 19, whereby, when the cover is clamped in position, the band will be compressed about the post 16 or 18 and between the two covers and will constitute an effective seal against the escape of electrolyte btween the posts and the battery cover. The clamping of the cover in position will similarly apply pressure to the elastic bands 20 and thereby insure a liquid-tight seal for the respective cells. It will be noted that the sealing means or gaskets 19 and 20 are of such character as to permit of some travel of the covers after sealing engagement has been effected. In other words, a considerable range of movement is possible without destroying the effectiveness of the seal and slight inaccuracies in dimension or position of parts are thus rendered immaterial. The clamping of the battery cover to the container also serves, through the pressure applied to the sealing means 19, to force the battery plates down upon the supporting ribs 7 and retain them yieldingly in position. The yielding character of the packing, however, permits the movement necessary to accommodate expansion or contraction without danger of breakage or of rendering the seal ineffective. Distortion of the battery cover is prevented by suitable reinforcing means which may comprise two longitudinally arranged ribs 27 from which transverse ribs 28, 29, extend laterally to the edges of the cover. The longitudinal ribs 27 may be reinforced by a metal strip 30 embedded therein in the process of manufacture. The ribs 27 terminate in enlargements or posts 31 upon which are seated handles 32 which may be stamped or pressed from sheet metal. In order to secure the handles in position and at the same time to clamp the cover to the body of the container 5, bolts 33 are employed, which are seated preferably in open grooves or channels 34, 35, formed respectively in the end surfaces of the container and of the cover. The head of the bolt, which is shown as being at the lower end, may be provided with a projecting point or ridge 36 adapted to embed itself into the material of the container at the lower end of the channel 34. The handle 32 may be provided with a similar ridge 37 adapted to be seated in a groove at the top of the post 31. When the parts have been properly secured together, as by turning down the nuts 38, the bolts and handles will be securely retained against displacement in any direction, while permitting easy inspection and removal or replacement if necessary. Furthermore, the positioning of the bolts in open channels provides space for expansion due to formation of sulphate should the bolts become corroded by electrolyte. The handles 32 are turned upwardly at their edges, as at 39, providing a rounded surface below for convenience in handling the battery and also affording means adapted to be engaged by the usual "hold-downs" or battery box clamps. Both the handles and bolts may be protected in some manner from corrosion, as by plating with lead, if the material be of iron or steel.

Ventilation of the cells is provided for by apertures 40 formed adjacent the ends of each cell cover, which communicate with grooves 41 in the lower surface of the battery cover 23. The grooves 41 lead to an annular channel 42 from which two passages 43 on opposite sides of the channel 42 extend inwardly to the annular space 44 surrounding the stopper 22. The space 44 communicates with the atmosphere through notches 45 and 46 formed respectively in the cell cover and in the edge of the flange 47 in the battery cover around the stopper 22. It will be noted that the passages and apertures thus provided insure proper venting whether the battery be in truly horizontal position or not and irrespective of the effect of capillary action in the space between the upper and lower covers.

The connection of the posts 16 and 18 to the respective sets of battery plates is preferably accomplished by casting the posts with a series of projections 48 extending, as shown, on both sides of the post at its lower end and forming therebetween notches adapted to receive projections 49 on the grids. The posts thus formed not only provide a liberal allowance of conducting material for the plate terminals, but render the posts sufficiently rigid to be handled and stored without serious liability to distortion, which latter is a common cause of complaint in commercial practice. The grids and posts may be integrally joined by the usual lead-burning operation.

The connection between the elements of the battery is made preferably by cell connectors comprising links 50, one of which is applied to each side of the rectangular posts 16, 18, and clamped in such position by nuts 51 and bolts 52. The connector links may be of lead or like material if desired, being enlarged intermediate their ends to provide increased capacity and having seats 50' adjacent the ends to prevent rotation of the nuts of the securing bolts. In order to eliminate corrosion of the bolts, they may be made of a non-corrosive alloy such, for example, as nichrome or Monel metal, or, if made of a corrosive metal, they may be coated with lead.

The rib 29 is of reduced height to permit the links 50 to be assembled in proper position. The ribs 28, on the other hand, extend to such a height that the links 50 could not be connected to posts on opposite sides of these ribs, thus again insuring proper assembly.

The terminal connectors 53, 54, are formed preferably, as shown, of a strap bent in the form of a loop or hook, the end of which is outwardly flanged as at 55. Nuts 56 and bolts 57, similar to the nuts and bolts 51, 52, serve to clamp the connectors to the respective posts, the out-turned ends of the flanges 55 operating to prevent rotation of the nut by engagement therewith. The posts 16, 18, are so formed as to prevent improper assembly with the terminal connectors 53, 54, the post 16 having flanges or wings 58 and the negative terminal 54 being made sufficiently short so that it cannot be placed over the wings 58 of the positive terminal.

It will be noted that the ribs 27, 28, 29, not only serve to stiffen the cover 23, but also assist in insulating the terminals by increasing the surface path between the respective battery posts. They also act to prevent any electrolyte which may be spilled upon the top of the container from spreading to other portions of the cover, inasmuch as the sections into which the upper surface of the cover is divided by the ribs, one for each battery post and one for the filling aperture, are all open to the edge of the cover and therefore facilitate the discharge of any liquid. Furthermore, the upper edges of the ribs are likely to remain dry and relatively clean, inasmuch as their form is such as to facilitate drainage, and the insulating effect is therefore enhanced. The space between the ribs 27 is a convenient location for a name, trade mark or other data which may be molded on the cover during its manufacture.

As compared with ordinary commercial practice at the present time, the invention renders it possible to eliminate the more or less fragile battery jars, the wooden battery box which is subject to quick deterioration from the action of electrolyte, the seal of asphaltum or like material which is difficult to apply and remove and entirely incapable of application unless the surfaces are dry, the permanently joined cell connectors, and the specially constructed breather caps. The invention therefore simplifies and cheapens the battery construction in some details and is furthermore of the greatest advantage in facilitating inspection and repair. The structure may be entirely disassembled with the greatest ease and rapidity, damaged or defective parts may be replaced, and the whole restored to a condition practically as good as that of a new battery, with very little expenditure of time and labor, and with no danger of improper assembly even though the workmen may be unskilled. The work of battery service and exchange may therefore be very greatly simplified.

It will be understood that the apertures 40 in the cell covers 11 may be much enlarged and in fact the cover may be reduced if desired to a mere skeleton or frame adapted to carry the sealing means or gaskets. However, if the central portion of the cover is eliminated, it will of course be necessary to provide other means to close the filling aperture, such, for example, as an ordinary breather cap suitably supported upon the outer cover 23.

While the specific disclosure herein refers to the formation of grooves or seats in the receptacle to receive the edges of the cell covers, it will be understood that the seats may be formed, if desired, wholly in the battery cover which then substantially encloses and positions the cell covers and gaskets, and the top of the receptacle, including the partitions, may be flat. With this arrangement, it may be desirable to secure the cell covers to the battery cover independently of the securing of the latter to the receptacle, which will further permit of the preliminary assembly of the battery elements, cell covers and battery cover in condition for immediate insertion in the receptacle for convenience in rapid replacement or servicing.

Various other changes in details of construction may be made without departing from the scope of the invention as set forth in the appended claims and therefore I do not wish to be limited to the exact structure herein described.

I claim:

1. In a battery container, a receptacle having vertical partitions integral with the walls of said receptacle forming compartments therein, an individual cover for each compartment, a gasket mounted upon each of said covers, and a cover engaging all of said individual covers and adapted to apply pressure thereto to form tight joints between the individual covers and the receptacle.

2. In a battery container, a receptacle having vertical partitions forming compartments, an individual cover for each compartment, an outer cover adapted to engage said individual covers and apply pressure thereto, and sealing means for each of said individual covers adapted to form tight joints between said individual covers and the receptacle and between said individual covers and said outer cover.

3. In a battery container, a receptacle having vertical partitions forming cell compartments, duplicate individual cell covers seated upon the peripheral walls and partitions of said receptacle, an elastic band formed around the periphery of each cell cover, and an outer cover adapted to engage and apply pressure to all the peripheral edges of said cell covers.

4. In a battery container, a receptacle, a cover, a gasket comprising a tensioned elastic band surrounding the peripheral edge of said cover and extending inwardly from the edge on both the upper and lower faces of the cover, and removable means for applying pressure to said gasket.

5. In a storage battery, a battery container having a cell chamber, battery elements therein having posts, a cover for said chamber having apertures through which said posts extend, yieldable gaskets surrounding said posts, and a container cover arranged to engage said gaskets and compress the same between said covers to seal said apertures.

6. In a battery container, a receptacle, a cover having on its upper surface longitudinal ribs extending from end to end thereof, and clamping means engaging said ribs adjacent to the ends of the cover and adapted to secure the cover to the receptacle.

7. In a battery container, a receptacle, a cover having on its upper surface longitudinal ribs extending from end to end, clamping means engaging said ribs adjacent to the ends thereof to secure the cover to the receptacle, and transverse ribs extending from each longitudinal rib to the side edges of the cover.

8. In a storage battery, a container, a cover therefor, a plurality of cells in said container having posts extending through said cover, the posts of different polarity having different dimensions, and means on said cover cooperating with said posts to prevent improper juxtaposition of the cells.

9. In a storage battery, a container, a cover therefor, a plurality of cells in said container having posts extending through said cover, means for connecting said posts to form a battery, and means on said cover to prevent improper arrangement of said connecting means.

10. A battery container, a cover therefor, handles on said cover, and means for securing said handles and cover to said container comprising bolts located in grooves in the ends of the cover and container.

11. A battery container, a cover therefor having ribs on its upper surface, handles seated on the ends of said ribs, and means for securing said handles and cover to said container comprising bolts located in grooves in the ends of the cover and container.

12. In a storage battery, a container and a handle therefor comprising a plate having means at the ends whereby the handle may be secured to said container, the intermediate portion of said handle having up-turned flanges whereby a rounded lower surface is provided for engagement with the hand and a channel for reception of battery securing devices.

13. In a storage battery, battery elements having rectangular posts, and terminal connectors therefor each comprising a strap bent to loop form, said loop portion engaging two sides of a post, and clamping means passing through said loop and post.

14. In a storage battery, battery elements having rectangular posts, and terminal connectors therefor each comprising a strap bent to loop form and engaging two sides of a post, and clamping means passing through said strap and post comprising a bolt and nut, the extremity of said loop bent to engage a part of said clamping means and prevent rotation thereof.

In testimony whereof I affix my signature.

JOHN M. LEA.